United States Patent
Sumikawa et al.

(10) Patent No.: US 9,816,616 B2
(45) Date of Patent: Nov. 14, 2017

(54) MAGNETIC FLUID SEAL

(71) Applicant: EAGLE INDUSTRY CO., LTD., Tokyo (JP)

(72) Inventors: Daiki Sumikawa, Tokyo (JP); Kotaro Oshita, Tokyo (JP)

(73) Assignee: Eagle Industries Co., Ltd., Minato-ku (JP)

( * ) Notice: Subject to any disclaimer, the term of this patent is extended or adjusted under 35 U.S.C. 154(b) by 6 days.

(21) Appl. No.: 14/391,126

(22) PCT Filed: May 7, 2013

(86) PCT No.: PCT/JP2013/062828
§ 371 (c)(1),
(2) Date: Oct. 7, 2014

(87) PCT Pub. No.: WO2013/187152
PCT Pub. Date: Dec. 19, 2013

(65) Prior Publication Data
US 2015/0115541 A1 Apr. 30, 2015

(30) Foreign Application Priority Data

Jun. 14, 2012 (JP) ................ 2012-134853

(51) Int. Cl.
*F16J 15/43* (2006.01)
*F16C 33/76* (2006.01)
*F16J 15/40* (2006.01)

(52) U.S. Cl.
CPC ............ *F16J 15/43* (2013.01); *F16C 33/763* (2013.01); *F16C 33/765* (2013.01); *F16J 15/40* (2013.01)

(58) Field of Classification Search
CPC ........ F16J 15/43; F16C 33/746; F16C 33/765
(Continued)

(56) References Cited

U.S. PATENT DOCUMENTS 4,486,026 A * 12/1984 Furumura ............. F16C 17/107
277/348
5,007,513 A * 4/1991 Carlson ................... F16J 15/43
192/21.5
(Continued)

FOREIGN PATENT DOCUMENTS

JP H07-71620 A 3/1995
JP H09-317899 A 12/1997
(Continued)

OTHER PUBLICATIONS

Office Action dated Oct. 2, 2015 in corresponding KR Application No. 10-2014-7029264 (with English translation).
International Search Report for PCT/JP2013/062828, ISA/JP, dated Aug. 6, 2013.
Korean notice of Decision of Refusal dated Mar. 25, 2016 (corresponding application).

*Primary Examiner* — Nicholas L Foster
(74) *Attorney, Agent, or Firm* — Harness, Dickey & Pierce, P.L.C.

(57) ABSTRACT

A magnetic fluid seal (20) sealing between an apparatus end (14) and a rotating shaft (22) going through the apparatus end, comprising a housing (38) comprising a magnetic flux generating means (28) generating a magnetic flux and a magnetic flux transfer means (24, 26) facing to the rotating shaft with a fine clearance and transferring the magnetic flux, and placed so as to move relatively in a radial direction of the rotating shaft with respect to the apparatus end and a magnetic fluid (44) held in the fine clearance by the magnetic flux generated by the magnetic flux generating means.

4 Claims, 3 Drawing Sheets

(58) Field of Classification Search
USPC .......................................................... 277/410
See application file for complete search history.

(56) References Cited

U.S. PATENT DOCUMENTS

| | | | | |
|---|---|---|---|---|
| 6,247,701 | B1* | 6/2001 | Kitada | F16J 15/43 |
| | | | | 277/410 |
| 8,328,199 | B2* | 12/2012 | Oshita | F16C 35/04 |
| | | | | 277/410 |
| 8,430,409 | B2* | 4/2013 | Mahoney | F16J 15/43 |
| | | | | 277/410 |
| 8,757,631 | B2* | 6/2014 | Suefuji | F16J 15/3464 |
| | | | | 277/390 |
| 2003/0042683 | A1* | 3/2003 | Takahashi | F16J 15/348 |
| | | | | 277/370 |
| 2006/0043682 | A1* | 3/2006 | Li | F16J 15/43 |
| | | | | 277/410 |
| 2010/0117303 | A1* | 5/2010 | Takahashi | F16J 15/3404 |
| | | | | 277/352 |
| 2011/0198814 | A1* | 8/2011 | Oshita | F16J 15/43 |
| | | | | 277/501 |
| 2011/0210519 | A1* | 9/2011 | Li | F16J 15/43 |
| | | | | 277/410 |

FOREIGN PATENT DOCUMENTS

| | | |
|---|---|---|
| JP | H10-220595 A | 8/1998 |
| JP | 2000-002338 A | 1/2000 |
| JP | 2000-002339 A | 1/2000 |
| JP | 2000-141269 A | 5/2000 |
| JP | 2001-269890 A | 10/2001 |

* cited by examiner

Outside The Apparatus

Inside The Apparatus

MAGNETIC FLUID SEAL

CROSS-REFERENCE TO RELATED APPLICATIONS

This application is a 371 U.S. National Stage of International Application No. PCT/JP2013/062828, filed May 7, 2013, which claims priority to Japanese Patent Application No. 2012-134853, filed Jun. 14, 2012. The disclosures of the above applications are incorporated herein by reference.

FIELD OF THE INVENTION

The present invention relates to a magnetic fluid seal used for such as a transmission part of motion into a sealed space.

DESCRIPTION OF THE RELATED ART

For example, in apparatus used for a manufacturing process for semiconductor devices or a coating/etching process, magnetic fluid seals which have a little intrusion such as oil mist from a bearing and can keep inside of the apparatus clean are used (refer to Patent Document 1 etc.). Also, from the same benefit, the magnetic fluid seals are applied to such as bearings of transfer robots used in a clean environment as well and the application field thereof is expected to further expand from now on.

However, magnetic fluid seals according to prior arts have a problem that, when a large load is imposed on a rotating shaft of an applicable apparatus, most of the load is received by the magnetic fluid seals. Thus, the magnetic fluid seals according to prior arts have a problem in downsizing and cost because they need to enlarge the size for supporting the load or use a very expensive bearing as one combined inside thereof when the rotating shaft is expected to receive a large load.

PRIOR ARTS

Patent Document: Japanese Unexamined Patent Publication No. H9-317899

SUMMARY OF THE INVENTION

Problems to be Solved by the Invention

The present invention has been made by considering the above situation, and an object of the present invention is to provide a magnetic fluid seal preferably applicable to even a rotating shaft which receives a load.

Solution to Problem

To achieve the above object, the magnetic fluid seal according to the present invention is a magnetic fluid seal sealing between an apparatus end and a rotating shaft going through the apparatus end, comprising a housing comprising a magnetic flux generating means generating a magnetic flux and a magnetic flux transfer means facing to the rotating shaft with a fine clearance and transferring the magnetic flux, and placed so as to move relatively in a radial direction of the rotating shaft with respect to the apparatus end and a magnetic fluid held in the fine clearance by the magnetic flux generated by the magnetic flux generating means.

Magnetic fluid seals according to the prior arts had a problem that they were subject to receive a load because they had a structure that a housing was fixed to an apparatus and a rotating shaft was firmly supported via a bearing and the housing from the necessity of maintaining a clearance to interpose a magnetic fluid and the like. In the magnetic fluid seal according to the present invention, because the housing is placed so as to move relatively in the radial direction of the rotating shaft with respect to the apparatus end, the magnetic fluid seal can entirely follow the movement of the rotating shaft even when, for example, leaning and vibration in the radial direction occur due to a large load on the rotating shaft and the magnetic fluid seal can avoid receiving the load.

Also, for example, the housing may be relatively movable in the rotation direction of the rotating shaft with respect to the apparatus end and a relative movement range of the housing in the rotation direction with respect to the apparatus end may be limited by a rotation stop part connected to the apparatus end and engageable with the housing.

Because the magnetic fluid seal whose housing is relatively movable in the both radial and rotation directions is realized by a simple embodiment that the housing is not fixed to the apparatus end, the magnetic fluid seal has a simple structure, an easy manufacturing, and an excellent durability. Also, the housing itself does not rotate freely because the rotation stop part limits the relative movement range of the housing.

Also, for example, the magnetic fluid seal according to the present invention may comprise a secondary seal part sealing between the housing and the apparatus end.

Even if the housing is movable with respect to the apparatus end, the sealability inside the apparatus is favorably maintained by the fact that the secondary seal part seals between the housing and the apparatus end.

Also, for example, the magnetic fluid seal according to the present invention may comprise a bearing supporting the housing with respect to the rotating shaft so as to rotate relatively.

The magnetic fluid seal according to the present invention has an embodiment where the housing is not at least completely fixed to the apparatus end. Besides this, in the embodiment, the magnetic fluid seal is entirely attached to the rotating shaft by the fact that the bearing supports the housing with respect to the rotating shaft. Therefore, the magnetic fluid seal can avoid receiving the load more effectively.

DETAILED DESCRIPTION OF THE PREFERRED EMBODIMENTS

First Embodiment

Figure 1:
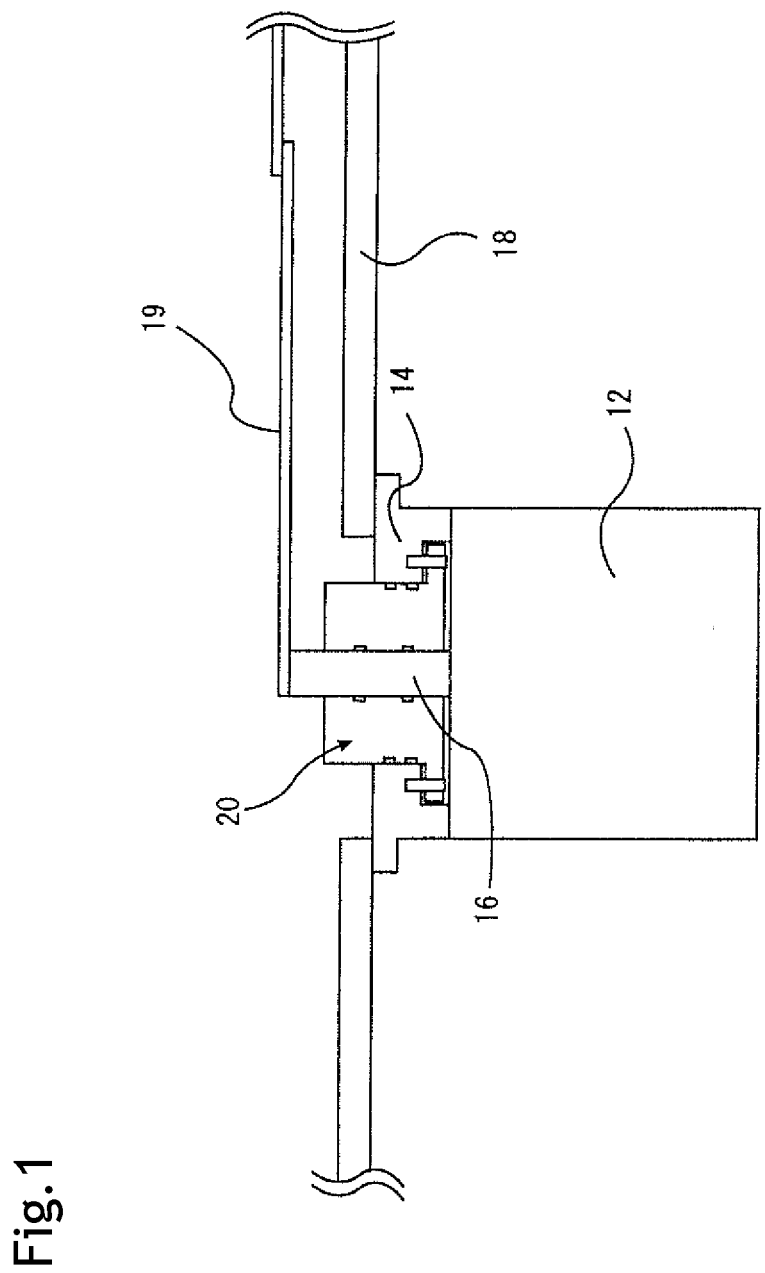
FIG. 1 is a schematic diagram of an apparatus applying a magnetic fluid seal according to one embodiment of the present invention.

FIG. 1 is a schematic diagram of a manufacturing apparatus applying a magnetic fluid seal 20 according to one embodiment of the present invention. The magnetic fluid seal 20 seals between an apparatus flange 14 (apparatus end) provided on a chamber 18 of the manufacturing apparatus and a rotating shaft 16 going through the apparatus flange 14. An end of the rotating shaft 16 at outside the apparatus is connected to a driving apparatus 12 such as a motor or a gear box, and the rotating shaft 16 rotates by a rotation force of the driving apparatus 12. An end of the rotating shaft 16 at inside the apparatus is located inside of the chamber 18 and connected to an arm 19. In the manufacturing apparatus, it is possible to keep inside the chamber 18 in a sealed state with respect to outside the chamber 18, and negative condition, compressed condition or atmospheric pressure condition is switched and maintained as needed. In the inside of the chamber 18, the arm 19 driven via the rotating shaft 16 can carry out transport of members or so.

Figure 2:
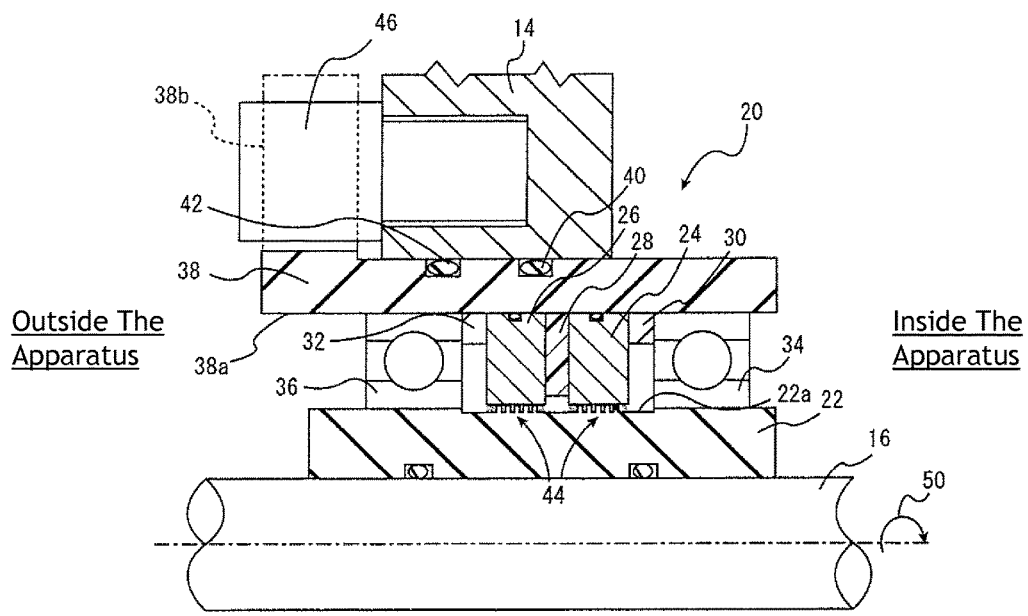
FIG. 2 is a cross section of the main part of the magnetic fluid seal shown in FIG. 1.

FIG. 2 is a cross section of the main part of the magnetic fluid seal 20 shown in FIG. 1. The magnetic fluid seal 20 comprises a housing 38 having a permanent magnet 28 and pole pieces 24 and 26, a shaft 22, bearings 34 and 36, O-rings 40 and 42, and locking pins 46 etc. The shaft 22 has a bottomless cylindrical shape. The shaft 22 is fixed on an outer peripheral surface of the rotating shaft 16 and rotated with the rotating shaft 16. A method for fixing the shaft 22 is not particularly limited and it is fixed on the rotating shaft 16 by using a set collar, a key or a bolt etc. The O-rings for sealing are provided between the shaft 22 and the rotating shaft 16.

The shaft 22 is composed of magnetic material, and a magnetic flux generated by the permanent magnet 28 mentioned below goes through the shaft 22. Note that, in the magnetic fluid seal 20, the shaft 22 and the rotating shaft 16 correspond to the rotating shaft in CLAIMS, but, for example, when the rotating shaft 16 itself is magnetic material, there is an embodiment not using the shaft 22. In the embodiment, the rotating shaft 16 corresponds to a rotating shaft.

The housing 38 has a cylindrical part inserted into a through hole formed at the apparatus flange 14 and a flange part connected to an end of the cylindrical part at outside the apparatus and projecting in an outer radial direction. The O-rings 40 and 42 as secondary seals for sealing between the housing 38 and the apparatus flange 14 are placed between the outer peripheral surface of the cylindrical part of the housing 38 and the apparatus flange 14.

The permanent magnet 28 as a magnetic flux generation means of and the pole pieces 24 and 26 as a magnetic flux transfer means are provided on an inner peripheral surface 38*a* of the cylindrical part of the housing 38. The permanent magnet 28 generates a magnetic flux, and a magnetic path is formed by transmission of the magnetic flux by the pole pieces 24 and 26 placed around the permanent magnet 28, the shaft 22 and a magnetic fluid. The permanent magnet 28 is connected to the pole pieces 24 and 26, or to the housing 38.

The pole pieces 24 and 26 have a ring shape. The pole pieces 24 and 26 are placed at both sides of the permanent magnet 28 by sandwiching it in the axial direction and composed of magnetic material. The pole pieces 24 and 26 transmit the magnetic flux generated by the permanent magnet 28. Outer peripheral ends of the pole pieces 24 and 26 are attached to the inner peripheral surface 38*a* of the cylindrical part of the housing 38, and the pole pieces 24 and 26 are attached so as not to relatively rotate to the housing 38. Inner peripheral ends of the pole pieces 24 and 26 face to an outer peripheral surface 22*a* of the shaft 22 with a fine clearance.

A magnetic fluid 44 is held by the magnetic flux generated by the permanent magnet 28 in the fine clearance formed between the pole pieces 24 and 26 and the outer peripheral surface 22*a* of the shaft 22. As the magnetic fluid 44, a fluid which magnetic ultrafine particles having grain diameters of about 5~50 nm or so are dispersed into a solvent or an oil (base oil) by using a surfactant is exemplified, for example. The magnetic fluid 44 moves along the magnetic flux and has a property of being trapped by magnetic field. The magnetic fluid 44 can ensure the sealability between the pole pieces 24 and 26 and the outer peripheral surface 22*a* of the shaft 22.

Unevenness may be formed on either or both of the inner peripheral end of the pole pieces 24 and 26 and the outer peripheral surface 22*a* of the shaft 22 facing thereto. By forming such an unevenness, the magnetic fluid 44 can be easily held in the fine clearance.

Figure 3:
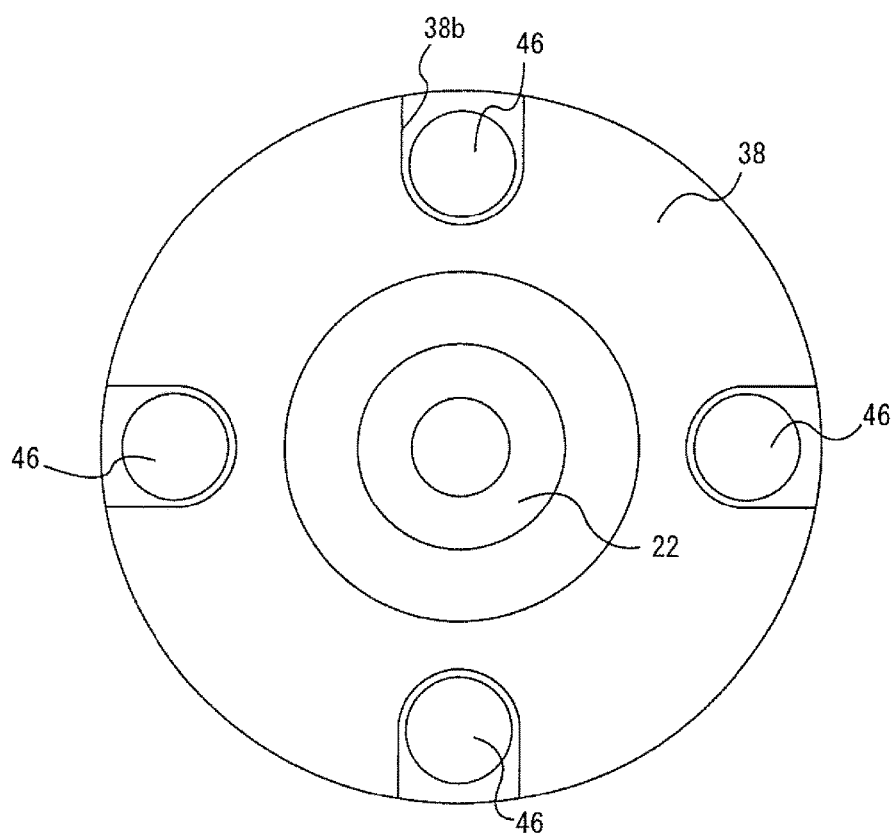
FIG. 3 is a plane view of the magnetic fluid seal shown in FIG. 2 seen from outside the apparatus.

FIG. 3 is a plane view of the magnetic fluid seal 20 seen from outside the apparatus. Notches 38*b* are formed on the flange parts of the housing 38. The locking pins 46, which are engageable with the notches 38*b* of the housing 38, are placed in the notches 38*b*. As shown in FIG. 2, the locking pins 46 are spirally locked to the apparatus flange 14 and can limit a relative movement range in the rotation direction of the housing 38 by engaging with the notches 38*b* of the housing 38.

The bearings 34 and 36 are placed between the inner peripheral surface 38*a* of the cylindrical part of the housing 38 and the outer peripheral surface 22*a* of the shaft 22. The bearings 34 and 36 are placed at both sides in the axial direction by sandwiching the pole pieces 24 and 26 and the permanent magnet 28. Non-magnetic material spacers 30 and 32 are sandwiched between the bearings 34 and 36 and the pole pieces 24 and 26. The spacers 30 and 32 prevent the magnetic flux generated by the permanent magnet 28 from escaping from the pole pieces 24 and 26.

The inner peripheral surface of the bearings 34 and 36 is connected to the outer peripheral surface 22*a* of the shaft 22. The outer peripheral surface of the bearings 34 and 36 is connected to the inner peripheral surface 38*a* of the housing 38. The bearings 34 and 36 support the housing 38 with respect to the shaft 22 so as to rotate relatively.

In the magnetic fluid seal 20 shown in FIGS. 1-3, the housing 38 is not fixed to the apparatus flange 14. Thus, the housing 38 is relatively movable in the radial direction, in the axial direction and in the rotation direction 50 of the rotating shaft 16 with respect to the apparatus flange 14. Particularly, since the housing 38 is relatively movable in the radial direction of the rotating shaft 16 with respect to the apparatus flange 14, the magnetic fluid seal 20 can entirely follow the movement of the rotating shaft 16 even when leaning and vibration in the radial direction occur due to a large load on the rotating shaft 16. From this, the magnetic fluid seal 20 can preferably avoid receiving the load via the rotating shaft 16, is advantageous to downsizing, and can be preferably applied to the rotating shaft 16 which receives the load. Also, the magnetic fluid seal 20 is advantageous in cost because bearings having a remarkably high endurance do not need to be used for the bearings 34 and 36 due to reduction of the load thereon.

Note that, since the housing 38 moves in the radial direction with respect to the apparatus flange 14, the O-rings 40 and 42 arranged between the housing 38 and the apparatus flange 14 are preferably manufactured by a material having an appropriate elasticity such as elastomer. From this, the O-rings 40 and 42 can more preferably seal between the housing 38 and the apparatus flange 14, and the magnetic fluid seal 20 can preferably keep inside the apparatus flange 14 in a sealed state.

Also, since the housing 38 is relatively movable not only in the radial direction but in the rotation and axial direction of the rotating shaft 16 with respect to the apparatus flange 14, the magnetic fluid seal 20 is realized by a simple structure to which the housing 38 and the apparatus flange 14 are not fixed. Therefore, the magnetic fluid seal 20 is assembled and manufactured easily and has a high durability.

Note that, the housing 38 does not rotate by a predetermined rotation angle or more with respect to the apparatus flange 14 because the locking pins 46 fixed to the apparatus flange 14 limit the relative movement range of the housing 38 (refer to FIG. 3). From this, under a circumstance where deformation of the rotating shaft 16 and vibration of the rotating shaft 16 and the shaft 22 generate, the magnetic fluid seal 20 is properly movable in accordance with the circumstance and can preferably seal between the rotating shaft 16 and the apparatus flange 14.

Further, since the bearings 34 and 36 support the housing 38 with respect to the shaft 22 so as to rotate relatively, the magnetic fluid seal 20 is properly supported by the rotating shaft 16 via the shaft 22 even if the housing 38 is not fixed to the apparatus flange 14.

EXPLANATION OF REFERENCE NUMERALS

12 . . . driving apparatus
14 . . . apparatus flange
16 . . . rotating shaft
18 . . . chamber
19 . . . arm
20 . . . magnetic fluid seal
22 . . . shaft
22a . . . shaft outer peripheral surface
24, 26 . . . pole piece
28 . . . permanent magnet
30, 32 . . . spacer
34, 36 . . . bearing
38 . . . housing
38a . . . housing inner peripheral surface
38b . . . notch
40, 42 . . . O-ring
44 . . . magnetic fluid
46 . . . locking pin
50 . . . rotation direction

The invention claimed is:

1. A magnetic fluid seal between an apparatus end of an apparatus and a rotating shaft going through the apparatus end, the magnetic fluid seal comprising:
   a housing comprising a permanent magnet generating a magnetic flux and pole pieces facing the rotating shaft with a fine clearance and transferring the magnetic flux; and
   a magnetic fluid held in the fine clearance by the magnetic flux generated by the permanent magnet, wherein
   the housing has a cylindrical part inserted into a through hole formed at the apparatus end and a flange part connected to an end of the cylindrical part outside the apparatus and projecting in an outer radial direction,
   notches are formed on the flange part of the housing, and rotation stop pins which are fixed to the apparatus end are placed in the notches so as to engage with the notches, said notches being wider in the circumferential direction of the shaft than any part of the rotation stop pins extending therethrough, said rotation stop pins allowing for limited movement in the rotational direction of the shaft, and
   the housing is relatively movable in a radial direction of the rotating shaft, in an axial direction of the rotating shaft and in a rotation direction of the rotating shaft with respect to the apparatus end in response to a deformation or a vibration of the rotating shaft during operation.

2. The magnetic fluid seal as set forth in claim 1, comprising a secondary seal part sealing between the housing and the apparatus end.

3. The magnetic fluid seal as set forth in claim 1, comprising a bearing supporting the housing with respect to the rotating shaft so as to rotate relatively.

4. The magnetic fluid seal as set forth in claim 3, comprising a secondary seal part sealing between the housing and the apparatus end.

* * * * *